UNITED STATES PATENT OFFICE.

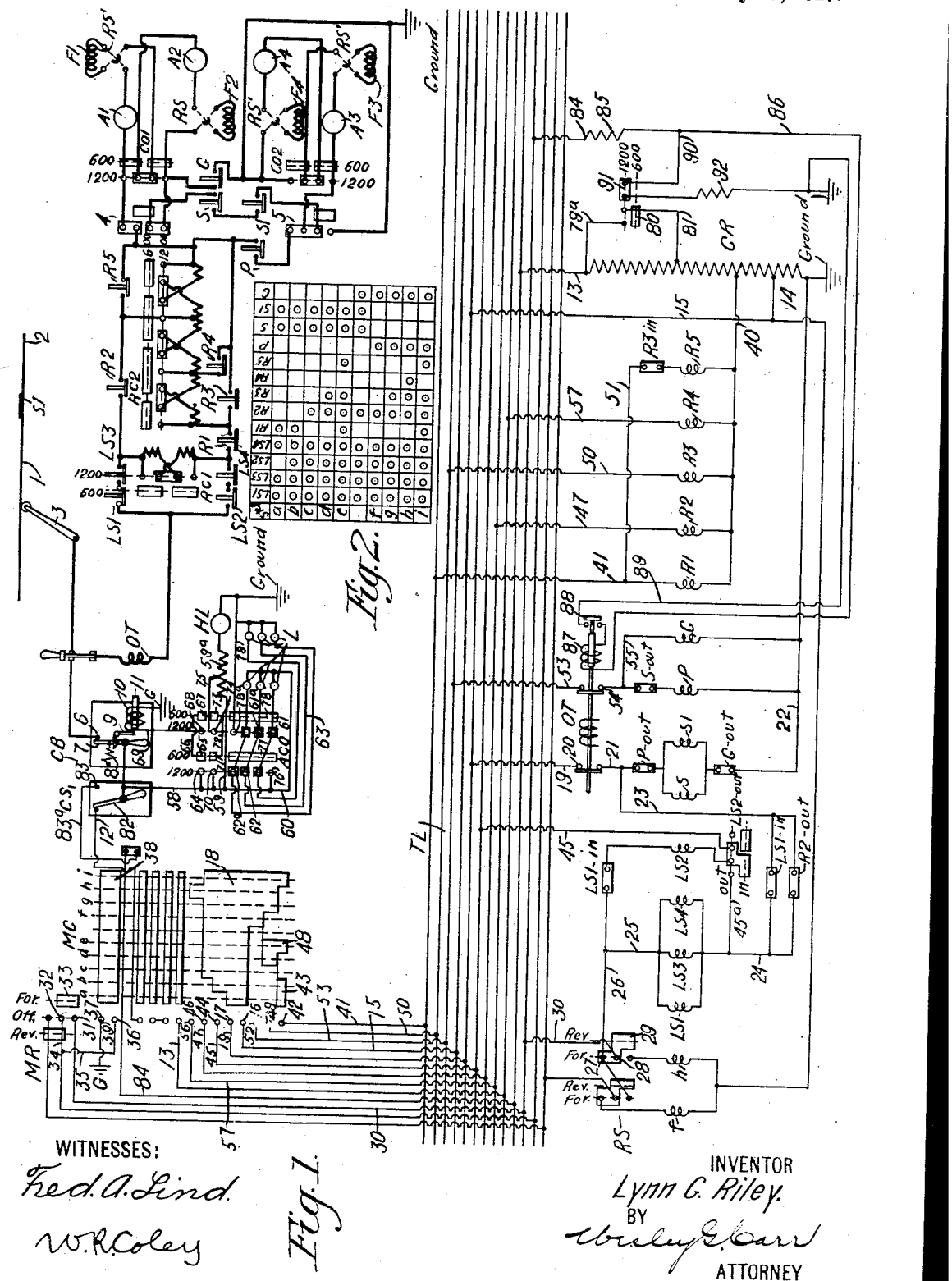

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,233,402.      Specification of Letters Patent.      Patented July 17, 1917.

Application filed May 25, 1914. Serial No. 840,727.

*To all whom it may concern:*

Be it known that I, LYNN G. RILEY, a citizen of the United States, and a resident of Wilkinsburg, in the county of Allegheny and State of Pennsylvania, have invented a new and useful Improvement in Control Systems, of which the following is a specification.

My invention relates to systems of control, and it has special reference to the control of electric railway motors that are embodied in a system that is adapted for operation from a plurality of supply circuits of materially different voltages.

In modern inter-urban railway service it is more or less customary to employ a supply circuit of relatively low voltage, for instance, 600 volts, when running through city properties or well populated districts and to utilize a supply circuit of materially higher voltage, 1200 volts, for example, when operating on the inter-urban portion of the system. The vehicles employed in such systems are usually provided with suitable change-over switches for adapting the motor connections to the particular supply circuit in use, and similar change-over switches are used in connection with the auxiliary translating devices that are usually employed, such as the control magnet coils and the car lamps, for similarly adapting their connections in accordance with the particular supply circuit employed.

The object of my invention is to provide a system of the above-indicated character which shall embody means for preventing the operation of the railway motors and of the auxiliary translating devices when the said motors and devices are connected to a supply circuit of higher voltage at the time when the change-over switches occupy a non-corresponding position, whereby the motors and translating devices are saved from any injurious effects, which would naturally occur if an abnormally high voltage for the particular set of connections employed were impressed upon them.

More specifically stated, the object of my invention is to provide, in a system of the class in question, circuit-breaking means for automatically interrupting the circuits of the motors and of the auxiliary translating devices, if the vehicle trolley becomes connected with the supply circuit of higher voltage when the change-over switch that is associated with the translating devices occupies its lower-voltage position.

In the accompanying drawing, Figure 1 is a diagrammatic view of a system of control embodying my invention, and Fig. 2 is a control chart illustrating the sequence of operation of the various switches shown in Fig. 1.

Referring to the drawing, the main circuits here shown comprise a plurality of supply circuits 1 and 2 of materially different voltages, 1200 and 600 volts, for example, which may be insulated from each other in any suitable manner, as by a section insulator $S^1$; a common return circuit marked "Ground;" a trolley 3 that is adapted for connection to either of the supply circuits 1 and 2; a plurality of electric motors respectively having armatures $A^1$, $A^2$, $A^3$ and $A^4$ and corresponding field windings $F^1$, $F^2$, $F^3$ and $F^4$; a reversing switch RS of any suitable construction having a plurality of switching members $RS^1$ that are associated with the several field windings; a plurality of accelerating resistors which are adapted to be suitably manipulated by means of a plurality of switches $R^1$ to $R^5$, inclusive; a plurality of motor-controlling switches $LS^1$ to $LS^4$, inclusive, P, S, $S^1$ and G; a plurality of change-over switches 4 and 5 that are respectively associated with the pairs of motors having armatures $A^1$ and $A^2$, and $A^3$ and $A^4$, and adapted to connect all the motors initially in series relation when the supply circuit 1 of higher voltage is employed, and to connect the motors initially in series-parallel relation when the supply circuit 2 is utilized; a plurality of cut-out switches $CO^1$ and $CO^2$ that are adapted to exclude either of the above-mentioned pairs of motors from circuit in either their low-voltage or their high-voltage relation; a plurality of change-over switches $RC^1$ and $RC^2$ for initially manipulating the circuit connections of the various accelerating resistors in accordance with the supply circuit employed; and the actuating coil of an overload trip switch marked "OT."

The auxiliary control circuits comprise my improved circuit-breaker CB; a control switch CS; a master controller MC that is adapted to occupy a plurality of motor-operating positions $a$ to $i$, inclusive; a master reverser MR that is adapted to occupy "reverse," "off," and "forward" positions; the various actuating coils of the switches shown in Fig. 1; a plurality of train line conductors TL for connecting the master controller circuits with the several magnet coils; a control resistor CR which is adapted for connection across either of the supply circuits 1 or 2, and from portions of which the various actuating coils are energized through the master controller; and a plurality of interlocking contact members that are designated with reference to the particular switch by which they are actuated, in accordance with familiar practice.

The auxiliary control circuits shown, comprise a plurality of sets of car lamps L, each set comprising a suitable number, such as six, which number is more or less customarily employed in car lighting systems; a head light HL; and a change-over switch ACO for arranging the circuits of the various auxiliary translating devices in accordance with the voltage of the energy supplied.

The circuit breaker CB comprises a pair of stationary and movable coöperating contact members 6 and 7, respectively; a spring 8 for suitably biasing the movable member 7 to an open position; a right-angled detent 9 for holding the movable member 7 in its closed position under predetermined conditions; a tripping coil 10 which is adapted for connection across the particular supply circuit employed, through the change-over switch ACO, when the latter occupies its lower-voltage position; and a movable core member 11 for the coil 10.

The operation of the circuit breaker may be briefly described as follows: When the coil 10 is energized from the supply circuit of lower voltage, the electromagnetic force exerted thereby is insufficient to actuate the core member 11. However, if the coil becomes connected across the supply circuit of higher voltage, with the change-over switch ACO still occupying its lower-voltage position, the force exerted by the coil is sufficient to actuate the core 11 to strike the detent 9 and release the movable member 7 therefrom, whereupon the spring 8 moves the member 7 to its "off" position. Inasmuch as the auxiliary control circuits and also the circuits of the auxiliary translating devices are interrupted by the opening of the circuit breaker CB, it will be noted that the operation of both the motors and translating devices is prevented until the change-over switch ACO is moved to its higher-voltage position, as hereinafter more fully described.

Assuming that the trolley 3 is connected to the supply circuit of higher voltage, that the various change-over switches occupy the position that corresponds to that supply circuit, that the master reverser is moved to its forward position and the master controller is actuated to its first position $a$, the operation of my control system may be set forth as follows: A circuit is established from the trolley 3 through the circuit breaker CB, the control switch CS, conductor 12, certain stationary and movable contact members of the master controller, conductor 13 and the control resistor CR to ground. Another circuit is thereupon established from an intermediate point in the control resistor through conductors 14 and 15, control fingers 16 and 17—which are bridged by a contact segment 18 of the master controller—, a conductor 19, coöperating stationary and movable contact members 20 of the overload trip OT, conductor 21, interlock "P-out", the coils of the switches S and $S^1$, interlock G-out and conductor 22 to "ground". Another circuit is completed from conductor 21 through conductor 23, interlock $R^2$-out, conductor 24, the actuating coils of the switches $LS^1$, $LS^3$ and $LS^4$, conductors 25 and 26, control fingers 27 and 28—which are bridged by a contact member 29 of the reversing switch RS—, conductor 30, control fingers 31 and 32—which are bridged by a contact member 33 of the master reverser—, conductors 34 and 35, control fingers 36 and 37—which are bridged by a contact segment 38 of the master controller—and a conductor 39 to ground. Another circuit is established from a second intermediate point in the control resistor CR through conductor 40, the actuating coil of the switch $R^1$, conductor 41, control finger 42 and contact segment 18 of the master controller, and thence returning to the conductor 14.

The motors are thus connected in series relation, inasmuch as the change-over switches 4 and 5 occupy their higher-voltage positions, and all of the accelerating resistors are included in circuit.

In position $b$ of the master controller, a control finger 44 makes contact with the contact segment 18, whence circuit is completed through conductor 45, interlock marked $LS^2$-out, the actuating coil of the switch $LS^2$, interlock $LS^1$-in and conductor 26 to ground. The switch $LS^2$ is then held closed by the energization of its coil through conductors 24 and $45^a$.

In position $c$, the contact segment 43 disengages the control finger 42, and the contact segment 18 energizes a control finger 46, from which point a circuit is established through conductor 47, the coil of the switch $R^2$ and conductor 40 to the control resistor.

In position $d$, a contact segment 48, which is energized from the contact segment 18, engages a control finger 49, whence circuit is established through conductor 50 and the actuating coil of switch $R^3$ to conductor 40. In position $e$, the contact segment 48 engages the control finger 42, thereby causing reclosure of the switch R¹. Also upon the closure of the switch R³ a circuit is established from conductor 41 through conductor 51, and interlock R³-in, to the actuating coil of the switch R⁵ and the conductor 40. In this way, the various resistor switches are suitably manipulated to gradually decrease the amount of resistance in series circuit with the motors; and in position $e$ all of the resistors are short-circuited, and the motors are disposed in full series relation.

During transition of the motors to series-parallel relation, the contact segment 48 disengages the control fingers 42 and 49, and the contact segment 18 energizes a control finger 52, from which point a circuit is established to conductor 53, stationary and movable coöperating contact members 54 of the overload trip, conductor 55 and the actuating coil of the switch G to the ground conductor 22. Upon the closure of the switch G, the control circuit through the coils of the switches S and S¹ is interrupted at the interlock G-out, and these switches are consequently opened, whereby a circuit is established from the conductor 55 through interlock S-out and the coil of the switch P to the conductor 22. In the first series-parallel position $f$, therefore, the motors are connected in series-parallel relation, with a certain amount of the accelerating resistance in circuit. In position $g$, the switch R³ is closed, as hereinbefore described; and in position $h$, the contact segment 18 energizes a control finger 56, whence circuit is completed through conductor 57 and the coil of the switch R⁴ to the conductor 40.

In position $i$, switches R¹ and R⁵ are again closed, in the manner hereinbefore described, and the switch R⁴ is opened by reason of the disengagement of the contact members 18 and 56. The members are thus connected in full series-parallel relation with all of the accelerating resistors excluded from circuit.

Assuming that it is desired to operate the motors from the supply circuit 2 of lower voltage, the various change-over switches 4, 5, RC¹, RC² and ACO are first moved to their respective lower-voltage positions, whereby the several motors are initially connected in series-parallel relation, and the accelerating resistors are combined in such manner as to offer a circuit of considerably lower resistance than was the case during operation from the supply circuit 1. The operation of the motor control system is then identical with that just described, and no other description thereof will be given here.

Assuming the auxiliary change-over switch ACO to occupy its position corresponding to the supply circuit of higher voltage, and that the trolley 3 is connected to that circuit; an auxiliary circuit is established from a point intermediate the circuit breaker CB and the control switch CS through conductors 58 and 59, a suitable resistor 59ª and a head light HL to ground. Another circuit is established from the conductor 58 through conductor 60, three sets of the lamps L that are connected in parallel circuit relation, coöperating stationary and movable contact members 61 and 61ª, and 62 and 62ª of the change-over switch ACO, and conductors 63 through three other sets of the lamps L, that are connected in parallel circuit relation, to "ground". In this way, there are two sets of the lamps L connected in series in each of the lighting circuits across the supply circuit 1.

If the switch is to be operated from the supply circuit 2 of lower voltage, and the change-over switch ACO is moved to its lower-voltage position, a circuit is then established from conductor 58, control finger 64, and contact member 65 of the change-over switch, conductor 66, contact member 67, control finger 68, conductor 69, and the tripping coil 10 of the circuit breaker CB to ground. The coil 10 is thus energized, but not sufficiently to cause the actuation of the core member 11. Another circuit is established from the conductor 58 through control fingers 70, contact members 71, conductors 72, contact member 73, control finger 74, conductor 75, and a suitable portion of the resistor 59ª, through the head light HL to ground. Another circuit is established from conductor 60 through control finger 76, contact member 77 to which all the conductors 63 are connected, and three parallel-connected sets of the lamps L to ground. The other three sets of lamps shown are connected from the conductor 60 through a contact member 78 of the change-over switch, control finger 78ª which is connected thereto and through conductor 79, to ground. The several individual sets of lamps are thus connected in parallel-circuit relation across the supply circuit 2.

However, if the change-over switch ACO should occupy its lower-voltage position when the trolley 3 comes into contact with the supply circuit 1 of higher voltage, then the increased energization of the tripping coil 10 is sufficient to cause the actuation of the core member 11, as hereinbefore described. For instance, if the supply circuits 1 and 2 are energized at 1200 and 600 volts, respectively, then the trip coil 10 may, for instance, be designed to actuate the core member 11, and, consequently, to open the circuit breaker CB, when a voltage of 750 bolts is impressed upon the coil. Inasmuch as the auxiliary control circuits for operating the various motor-circuit switches and also for energizing the several auxiliary translating devices are connected through the circuit breaker CB, the automatic opening thereof, in the manner described, will prevent further operation of either the motors or the auxiliary translating devices until the auxiliary change-over switch ACO is moved to the position which corresponds to the supply circuit 1 of higher voltage.

When the system is connected to the supply circuit 2 of lower voltage, a portion of the control resistor CR is short circuited through conductor 79$^a$, interlocking contact member 80 and the conductor 81, thereby permitting substantially the same currents to traverse the various actuating coils, during operation from either supply circuit.

Assuming that the overload trip OT has been opened by reason of the traversal of abnormal current through the motor circuits, the reclosure of the trip is accomplished as follows: The movable contact member 82 of the control switch CS is actuated to make contact with a stationary contact member 83, whence circuit is completed through conductors 83$^a$ and 84, a resistor 85, a conductor 86, the resetting coil 87 for the overload trip, coöperating stationary and movable contact members 88 of the overload trip, which members engage only when the trip occupies its open position, and conductor 89 to the ground. During operation from the supply circuit of higher voltage the coil 87 is shunted by conductor 90, interlocking contact member 91, and a resistor 92, whereas, during operation from the supply circuit of lower voltage, this short circuit is removed, in order to maintain the operating conditions of the coil 87 substantially identical.

I do not wish to be restricted to the specific circuit connections or arrangement of parts herein set forth, but desire that only such limitations shall be imposed as are indicated in the appended claims.

I claim as my invention:

1. In a control system, the combination with a plurality of supply circuits of materially different voltages, and a plurality of electric motors, of means for arranging the motor circuits in accordance with the supply circuit employed, a plurality of auxiliary translating devices, a unitary switching device for arranging the circuits of said translating devices correspondingly to the supply circuit employed, and means for automatically causing the interruption of the circuits of the motors and of the translating devices upon connection thereof to the supply circuit of higher voltage when said switching device occupies its lower-voltage position.

2. In a control system, the combination with a plurality of supply circuits of materially different voltages, and a plurality of electric motors, of means for arranging the motors initially in series or in series-parallel relation in accordance with the supply-circuit employed, a plurality of auxiliary translating devices, a multi-position switching device for arranging the circuits of said translating devices correspondingly to the supply circuit employed, and an electromagnetic device for automatically causing the interruption of the circuits of the motors and of the translating devices upon connection thereof to the supply circuit of higher voltage when said switching device occupies its lower-voltage position.

3. In a control system, the combination with a plurality of supply circuits of materially different voltages, a plurality of electric motors, a plurality of motor-controlling switches, a plurality of electro-magnetic means for severally actuating said switches, and a master controller for governing the operation of said electro-magnetic means, of main-circuit means for arranging the motors initially in series or in series-parallel relation in accordance with the supply circuit employed, a plurality of auxiliary translating devices, a multi-position switching device for arranging the circuits of said translating devices correspondingly to the supply circuit employed, and circuit-breaking means having an actuating coil adapted to be operatively energized upon connection to the supply circuit of higher voltage when said switching device occupies its lower-voltage position, whereby the circuits to said motors and to said translating devices are interrupted.

4. In a control system, the combination with a plurality of supply circuits of materially different voltages, and a plurality of electric motors, of means for arranging the motor circuits in accordance with the supply circuit employed, a plurality of auxiliary translating devices, a switching device for arranging the circuits of said translating devices corresponding to the supply circuit employed, and means energized in only the lower-voltage position of the switching device for causing the interruption of the circuits of the motors and of the translating devices upon connection thereof to the supply circuit of higher voltage under predetermined conditions.

In testimony whereof, I have hereunto subscribed my name this 19th day of May, 1914.

LYNN G. RILEY.

Witnesses:
G. R. IRWIN,
B. B. HINES.

Copies of this patent may be obtained for five cents each, by addressing the "Commissioner of Patents, Washington, D. C."